US012538193B2

(12) United States Patent
Zhou et al.

(10) Patent No.: US 12,538,193 B2
(45) Date of Patent: Jan. 27, 2026

(54) FAST CA/DC RECONFIGURATION IN L1/L2 BASED INTER-CELL MOBILITY

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 683 days.

(21) Appl. No.: 17/372,143

(22) Filed: Jul. 9, 2021

(65) Prior Publication Data

US 2022/0014983 A1    Jan. 13, 2022

Related U.S. Application Data

(60) Provisional application No. 63/051,361, filed on Jul. 13, 2020.

(51) Int. Cl.
  *H04W 36/00*  (2009.01)
  *H04W 36/36*  (2009.01)
(52) U.S. Cl.
  CPC ........... *H04W 36/00835* (2018.08); *H04W 36/00692* (2023.05); *H04W 36/362* (2023.05)
(58) Field of Classification Search
  CPC ... H04W 4/20; H04W 28/12; H04W 36/0005; H04W 36/0055; H04W 36/0061;
  (Continued)

(56) References Cited

U.S. PATENT DOCUMENTS 9,775,077 B2    9/2017 Yang et al.
2012/0046066 A1*  2/2012 Tamura ........... H04W 36/00835
                                          455/67.11
(Continued)

FOREIGN PATENT DOCUMENTS

CN    111406421 A    7/2020
WO    2016040328    3/2016

OTHER PUBLICATIONS

3GPP TS 38.401: "3rd Generation Partnership Project, Technical Specification Group Radio Access Network, NG-RAN, Architecture Description (Release 16)", V16.2.0 (Jul. 2020), 3GPP Draft, Draft 38401-G20 V3, 3rd Generation Partnership Project (3GPP), Mobile Competence Centre, 650, Route Des Lucioles, F-06921, Sophia-Antipolis Cedex, France, Jul. 9, 2020 (Jul. 9, 2020), 77 Pages, XP051908117.
(Continued)

*Primary Examiner* — Matthew W Genack
(74) *Attorney, Agent, or Firm* — Patterson & Sheridan, LLP

(57) ABSTRACT

Aspects of the present disclosure provide a technique for wireless communications by a user equipment (UE). The UE receives signaling configuring multiple candidate target physical cell identifiers (PCIs) of at least one candidate target cell that support physical (PHY) layer or medium access control (MAC) layer mobility signaling. The UE participates in a handover procedure to a target cell associated with a selected one or more of the candidate target PCIs based on the PHY layer or the MAC layer mobility signaling. The UE modifies a configuration for at least one cell group (CG), wherein the one or more of the candidate target PCIs are associated with component carriers (CCs) of the at least one CG.

30 Claims, 11 Drawing Sheets

(58) Field of Classification Search
CPC ....... H04W 36/0069; H04W 36/00692; H04W 36/0083; H04W 36/00835; H04W 76/10; H04W 76/11
See application file for complete search history.

(56) References Cited

U.S. PATENT DOCUMENTS

| | | | |
|---|---|---|---|
| 2013/0272132 A1* | 10/2013 | Heo | H04W 74/0833 370/236.2 |
| 2017/0318450 A1 | 11/2017 | Salkintzis | |
| 2018/0014218 A1 | 1/2018 | Kubota et al. | |
| 2018/0279182 A1 | 9/2018 | Sang et al. | |
| 2020/0008245 A1* | 1/2020 | Yan | H04W 36/0072 |
| 2020/0305216 A1* | 9/2020 | Kim | H04W 76/19 |
| 2023/0007499 A1* | 1/2023 | Da Silva | H04W 24/02 |

OTHER PUBLICATIONS

Huawei, et al., "Mobility Enhancements Under CU-DU Architecture", 3GPP TSG-RAN WG2 #107, 3GPP Draft, R2-1910602 Mobility Enhancements Under CU-DU Architecture, 3rd Generation Partnership Project (3GPP), Mobile Competence Centre, 650, Route Des Lucioles, F-06921 Sophia-Antipolis Cedex, vol. RAN WG2, No. Prague, Czech Republic, Aug. 26, 2019-Aug. 30, 2019, Aug. 16, 2019 (Aug. 16, 2019), 3 Pages, XP051768377.
International Search Report and Written Opinion—PCT/US2021/041198—ISA/EPO—Oct. 29, 2021.
Qualcomm Incorporated: "L1/L2 Mobility Overview", 3GPP TSG-RAN WG2 Meeting #114-e, 3GPP Draft, R2-2105354, 3rd Generation Partnership Project (3GPP), Mobile Competence Centre, 650, Route Des Lucioles, F-06921 Sophia-Antipolis Cedex, France, vol. RAN WG2, No. Electronic, May 19, 2021-May 27, 2021, 4 Pages, May 11, 2021 (May 11, 2021), XP052006989.

* cited by examiner

FAST CA/DC RECONFIGURATION IN L1/L2 BASED INTER-CELL MOBILITY

CROSS-REFERENCE TO RELATED APPLICATION

This application claims benefit of and priority to U.S. Provisional Patent Application No. 63/051,361, filed Jul. 13, 2020, which is hereby incorporated by reference in its entirety.

BACKGROUND

Field of the Disclosure

Aspects of the present disclosure relate to wireless communications, and more particularly, to techniques for a cell reconfiguration in systems that support inter-cell mobility based on a physical layer (PHY, Layer 1 or L1) or a medium access control (MAC, Layer 2 or L2) 1/layer 2 (L1/L2) signaling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes. After considering this discussion, and particularly after reading the section entitled "Detailed Description" one will understand how the features of this disclosure provide advantages that include improved and desirable techniques for a cell reconfiguration in systems that support inter-cell mobility based on a physical layer (PHY, Layer 1 or L1) or a medium access control (MAC, Layer 2 or L2) 1/layer 2 (L1/L2) signaling.

Certain aspects of the subject matter described in this disclosure can be implemented in a method for wireless communication by a user equipment (UE). The method generally includes receiving signaling configuring multiple candidate target physical cell identifiers (PCIs) of at least one candidate target cell that support PHY layer or MAC layer mobility signaling, participating in a handover procedure to a target cell associated with a selected one or more of the candidate target PCIs based on the PHY layer or the MAC layer mobility signaling, and modifying a configuration for at least one cell group (CG), wherein the one or more of the candidate target PCIs are associated with component carriers (CCs) of the at least one CG.

Certain aspects of the subject matter described in this disclosure can be implemented in a method for wireless communication by a network entity. The method generally includes transmitting, to a UE, signaling configuring multiple candidate target PCIs of at least one candidate target cell that support PHY layer or MAC layer mobility signaling, participating in a handover procedure of the UE to a target cell associated with a selected one or more of the candidate target PCIs based on the PHY layer or the MAC layer mobility signaling, and modifying a configuration for at least one CG, wherein the one or more of the candidate target PCIs are associated with CCs of the at least one CG.

Certain aspects provide an apparatus for wireless communications by a UE. The apparatus generally includes at least one processor and a memory configured to: receive signaling configuring multiple candidate target PCIs of at least one candidate target cell that support PHY layer or MAC layer mobility signaling; participate in a handover procedure to a target cell associated with a selected one or more of the candidate target PCIs based on the PHY layer or the MAC layer mobility signaling; and modify a configuration for at least one CG, wherein the one or more of the candidate target PCIs are associated with CCs of the at least one CG.

Certain aspects provide an apparatus for wireless communications by a network entity. The apparatus generally includes at least one processor and a memory configured to: transmit, to a UE, signaling configuring multiple candidate target PCIs of at least one candidate target cell that support PHY layer or MAC layer mobility signaling; participate in a handover procedure of the UE to a target cell associated with a selected one or more of the candidate target PCIs based on the PHY layer or the MAC layer mobility signaling; and modify a configuration for at least one CG, wherein the one or more of the candidate target PCIs are associated with CCs of the at least one CG.

Certain aspects provide an apparatus for wireless communications by a UE. The apparatus generally includes means receiving signaling configuring multiple candidate target PCIs of at least one candidate target cell that support PHY layer or MAC layer mobility signaling; means for participating in a handover procedure to a target cell associated with a selected one or more of the candidate target PCIs based on the PHY layer or the MAC layer mobility signaling; and means for modifying a configuration for at least one CG, wherein the one or more of the candidate target PCIs are associated with CCs of the at least one CG.

Certain aspects provide an apparatus for wireless communications by a network entity. The apparatus generally includes means for transmitting, to a UE, signaling configuring multiple candidate target PCIs of at least one candidate target cell that support PHY layer or MAC layer mobility signaling; means for participating in a handover procedure of the UE to a target cell associated with a selected one or more of the candidate target PCIs based on the PHY layer or the MAC layer mobility signaling; and means for modifying a configuration for at least one CG, wherein the one or more of the candidate target PCIs are associated with CCs of the at least one CG.

Certain aspects of the subject matter described in this disclosure can be implemented in a computer readable medium storing computer executable code thereon for wireless communications by a UE. The computer readable medium comprises code for receiving signaling configuring multiple candidate target PCIs of at least one candidate target cell that support PHY layer or MAC layer mobility signaling; code for participating in a handover procedure to a target cell associated with a selected one or more of the candidate target PCIs based on the PHY layer or the MAC layer mobility signaling; and code for modifying a configuration for at least one CG, wherein the one or more of the candidate target PCIs are associated with CCs of the at least one CG.

Certain aspects of the subject matter described in this disclosure can be implemented in a computer readable medium storing computer executable code thereon for wireless communications by a network entity. The computer readable medium comprises code for transmitting, to a UE, signaling configuring multiple candidate target PCIs of at least one candidate target cell that support PHY layer or MAC layer mobility signaling; code for participating in a handover procedure of the UE to a target cell associated with a selected one or more of the candidate target PCIs based on the PHY layer or the MAC layer mobility signaling; and code for modifying a configuration for at least one CG, wherein the one or more of the candidate target PCIs are associated with CCs of the at least one CG.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
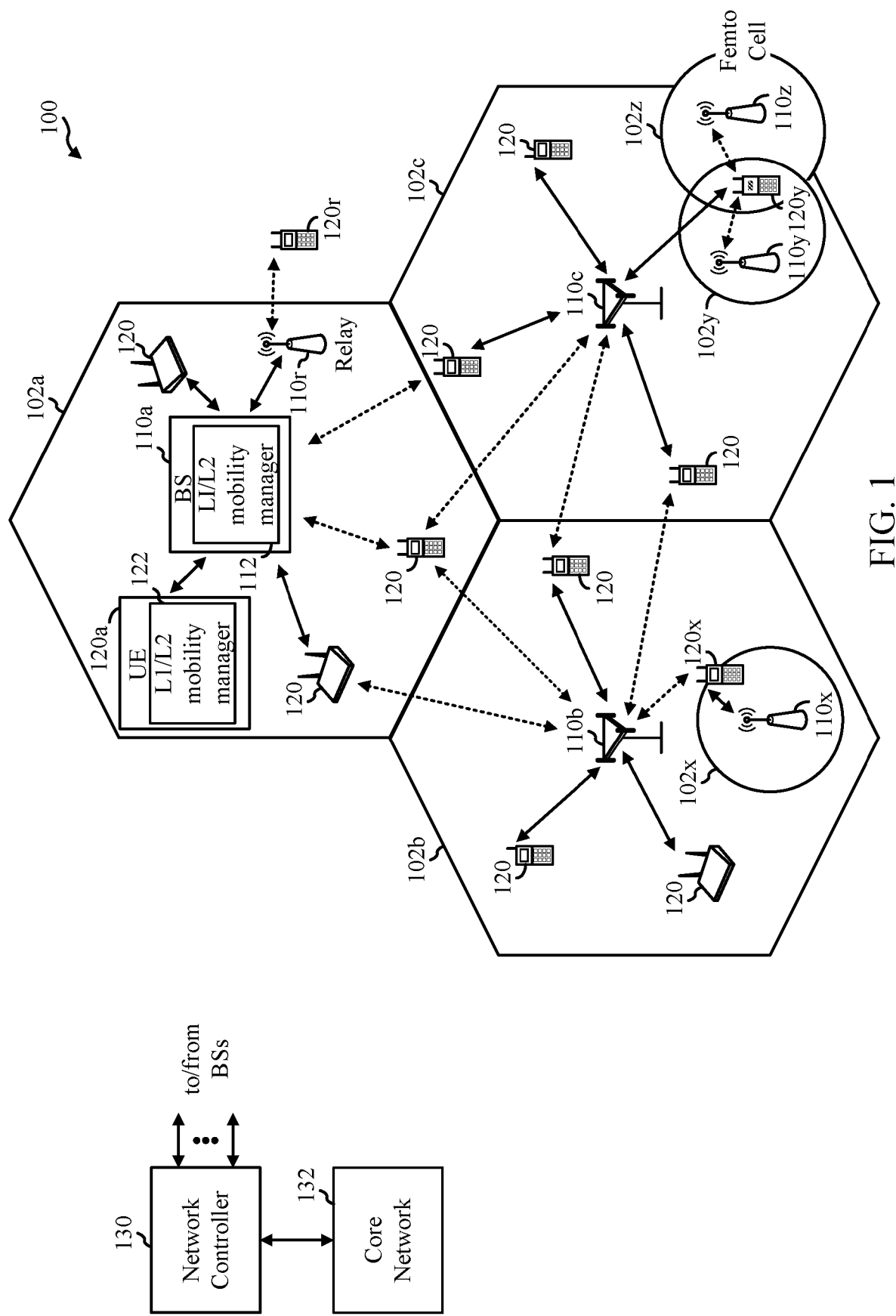
FIG. 1 is a block diagram conceptually illustrating an example wireless communication network, in accordance with certain aspects of the present disclosure.

Aspects of the present disclosure provide apparatus, methods, processing systems, and computer readable mediums for techniques for a cell group reconfiguration in systems that support inter-cell mobility based on a physical layer (PHY, Layer 1 or L1) or a medium access control (MAC, Layer 2 or L2) 1/layer 2 (L1/L2) signaling. For example, the techniques presented herein may be applied to setup, update, and/or release cell groups (CGs) in carrier aggregation (CA) and/or dual connectivity (DC) configurations.

The following description provides examples of inter-cell mobility in wireless communication system. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from an extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120. As shown in FIG. 1, a UE 120a includes a layer 1/layer 2 (L1/L2) mobility manager 122 that is configured to perform operations 700 of FIG. 7. A BS 110a includes an L1/L2 mobility manager 112 that is configured to perform operations 800 of FIG. 8.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell," which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS fora pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (for example, 120x, 120y, etc.) may be dispersed throughout the wireless communication network 100, and each UE 120 may be stationary or mobile. The wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
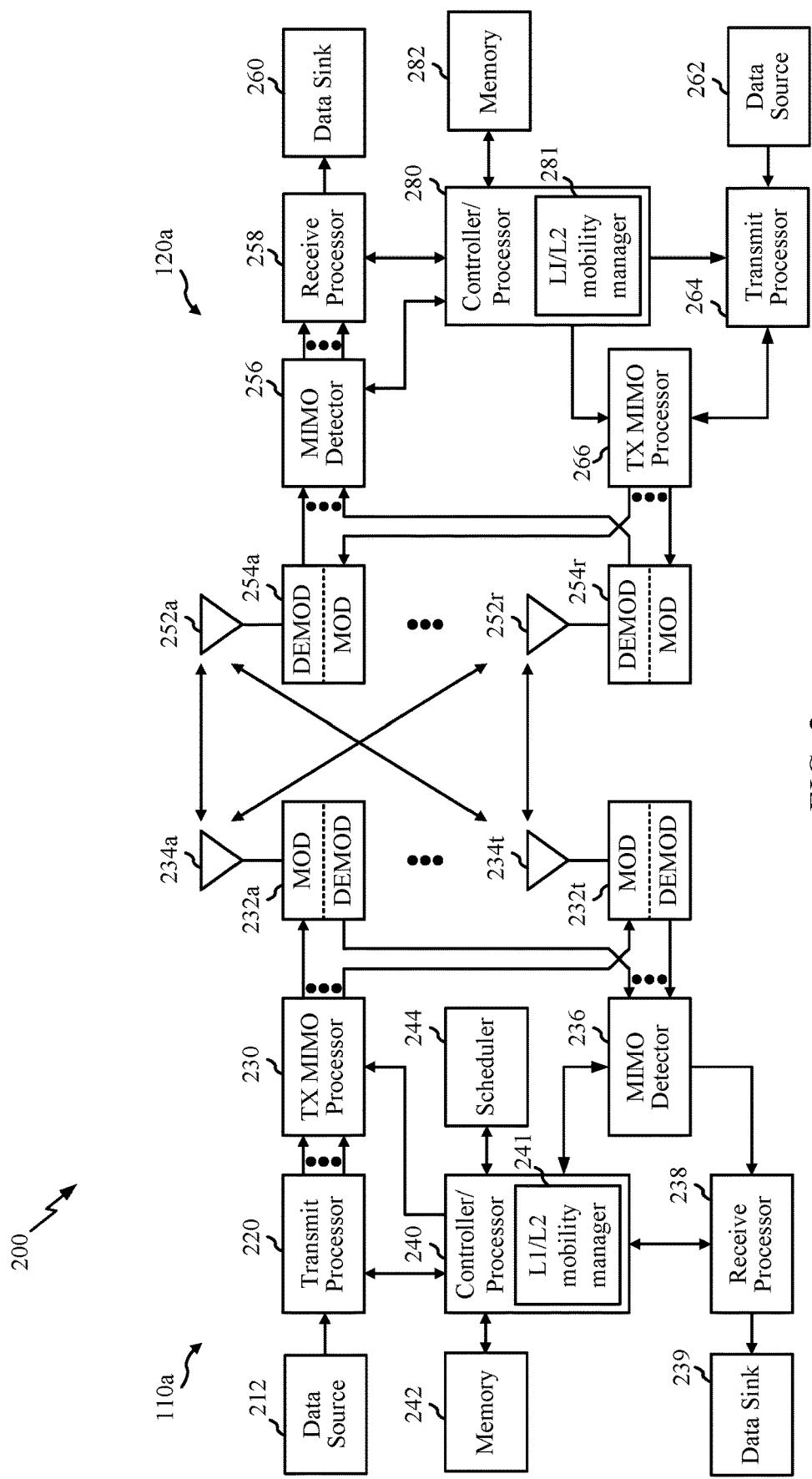
FIG. 2 is a block diagram conceptually illustrating an example base station (BS) and an example user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a cell-specific reference signal (CRS). A TX multiple-input multiple-output (MIMO) processor 230 may perform spatial processing (for example, precoding) on the data symbols, the control symbols, or the reference symbols, if applicable, and may provide output symbol streams to modulators (MODs) in transceivers 232a-232t. Each MOD in transceivers 232 may process a respective output symbol stream (for example, for orthogonal frequency division multiplexing (OFDM), etc.) to obtain an output sample stream. Each MOD in transceivers 232a-232t may further process (for example, convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110 and may provide received signals to demodulators (DEMODs) in transceivers 254a-254r, respectively. Each DEMOD in the transceiver 254 may condition (for example, filter, amplify, downconvert, and digitize) a respective received signal to obtain input samples. Each DEMOD in the transceiver may further process the input samples (for example, for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On an uplink (UL), at UE 120a, a transmit processor 264 may receive and process data (for example, for a PUSCH) from a data source 262 and control information (for example, for a physical uplink control channel (PUCCH) from the controller/processor 280. The transmit processor 264 may also generate reference symbols for a reference signal (for example, for a sounding reference signal (SRS)). The symbols from the transmit processor 264 may be precoded by a transmit MIMO processor 266 if applicable, further processed by the demodulators in the MODs in transceivers 254a-254r (for example, for SC-FDM, etc.), and transmitted to the BS 110. At the BS 110a, the uplink signals from the UE 120a may be received by the antennas 234, processed by the DEMODs in transceivers 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

Memories 242 and 282 may store data and program codes for BS 110a and the UE 120a, respectively. A scheduler 244 may schedule the UEs 120a for data transmission on a DL or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an L1/L2 mobility manager 241 that may be configured to perform the operations illustrated in FIG. 8, as well as other operations disclosed herein. As shown in FIG. 2, the controller/processor 280 of the UE 120a has an L1/L2 mobility manager 281 that may be configured to perform the operations illustrated in FIG. 7, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3A:
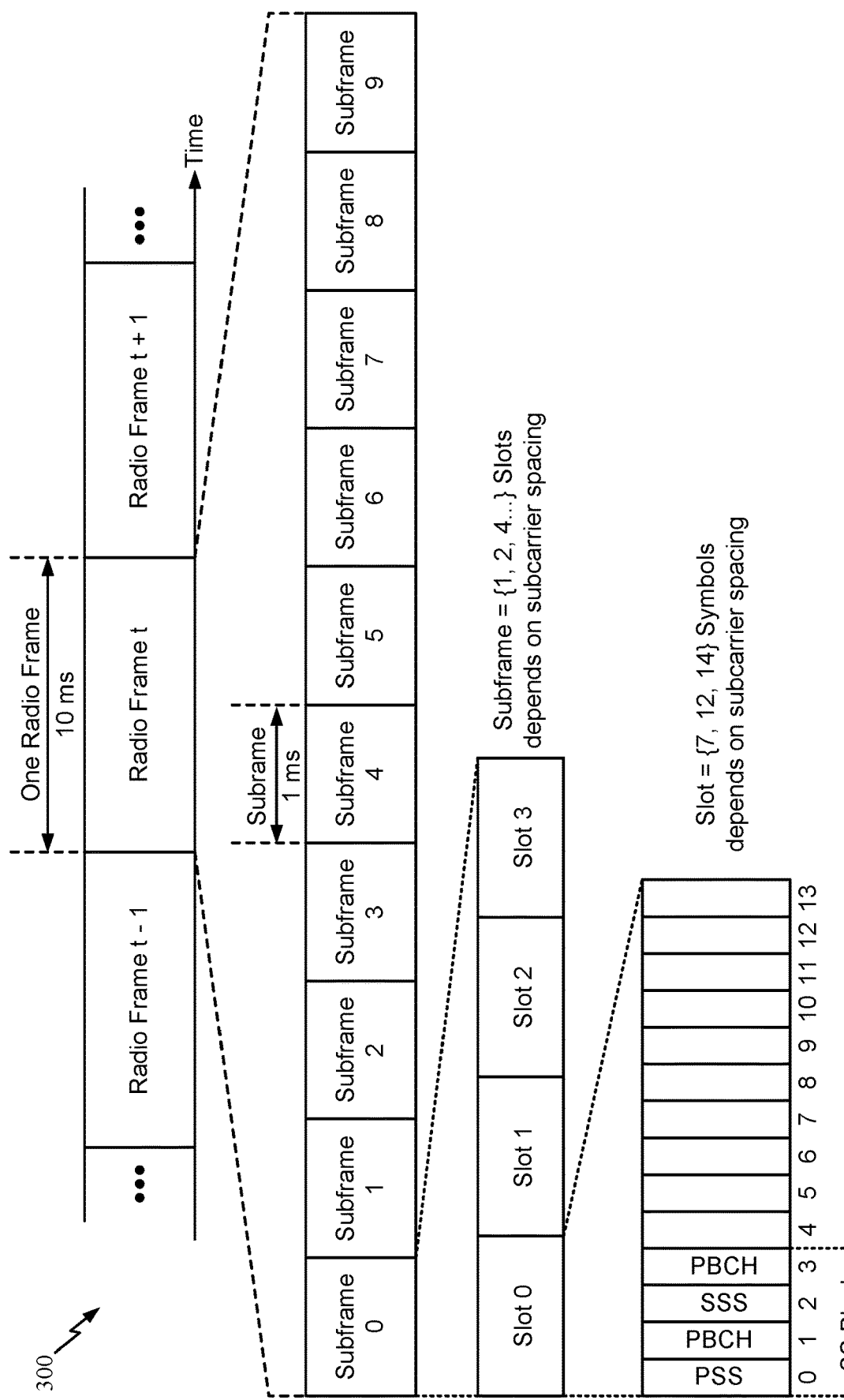
FIG. 3A is an example of a frame format for certain wireless communication systems (e.g., a new radio (NR)), in accordance with certain aspects of the present disclosure.

FIG. 3A is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots depending on a SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmW.

The multiple transmissions of the SSB are referred to as a SS burst set. The SSBs in an SS burst set are transmitted in the same frequency region, while the SSBs in different SS bursts sets can be transmitted at different frequency regions.

Figure 3B:
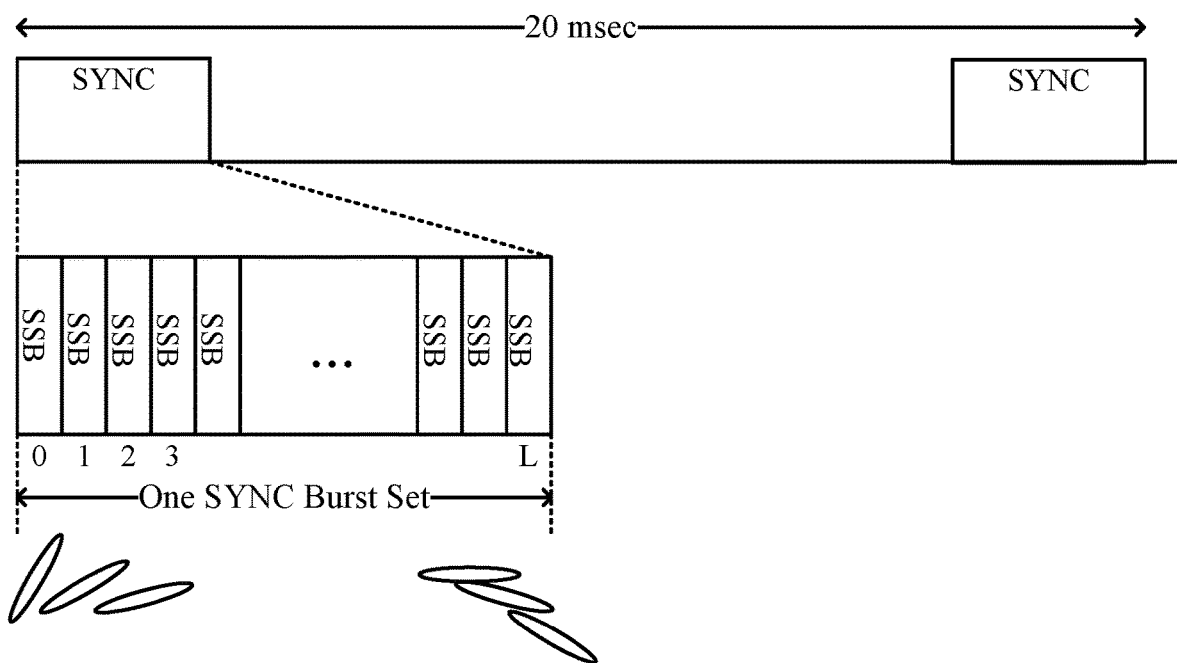
FIG. 3B illustrates example synchronization signal blocks (SSBs) sent using different beams, in accordance with certain aspects of the present disclosure.

As shown in FIG. 3B, SSBs may be organized into SS burst sets to support beam sweeping. As shown, each SSB within a burst set may be transmitted using a different beam, which helps a UE quickly acquire both transmit (Tx) and receive (Rx) beams (particular for mmW applications). A physical cell identity (PCI) may still be decoded from a PSS and a SSS of the SSB.

A control resource set (CORESET) for wireless communication systems, such as an NR and LTE systems, may include one or more control resource (e.g., time and frequency resources) sets, configured for conveying a PDCCH, within a system bandwidth. Within each CORESET, one or more search spaces (e.g., a common search space (CSS), a UE-specific search space (USS), etc.) are defined for a given UE. According to aspects of the present disclosure, the CORESET is a set of time and frequency domain resources, defined in units of resource element groups (REGs). Each REG includes a fixed number (e.g., twelve) of tones in one symbol period (e.g., a symbol period of a slot), where one tone in one symbol period is referred to as a resource element (RE). A fixed number of REGs may be included in a control channel element (CCE). Sets of CCEs may be used to transmit NR-PDCCHs, with different numbers of CCEs in the sets used to transmit NR-PDCCHs using differing aggregation levels. Multiple sets of CCEs may be defined as search spaces for UEs, and thus a NodeB (or other BS) may transmit an NR-PDCCH to a UE by transmitting the NR-PDCCH in a set of CCEs that is defined as a decoding candidate within a search space for the UE, and the UE may receive the NR-PDCCH by searching in the search spaces for the UE and decoding the NR-PDCCH transmitted by the NodeB.

Example Methods for L1/L2 Mobility

Aspects of the present disclosure relate to wireless communications, and more particularly, to mobility techniques that allow for dynamically updating a set of cells and/or beams activated to serve a user equipment (UE). As will be described in greater detail below, setoff activated cells may be updated based on a physical (PHY) layer (Layer1 or L1) or a medium access control (MAC) layer (Layer2 or L2) signaling that indicates one or more cells and/or beams to activate and/or de-activate.

The techniques presented herein may be applied in various bands utilized for new radio (NR). For example, for a higher band referred to as FR4 (e.g., 52.6 GHz-114.25 GHz), an orthogonal frequency division multiplexing (OFDM) waveform with very large subcarrier spacing (960 kHz-3.84 MHz) is required to combat severe phase noise. Due to a large subcarrier spacing (SCS), a slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

In a multi-beam operation (e.g., involving FR1 and FR2 bands), more efficient uplink (UL)/downlink (DL) beam management may allow for increased intra-cell and inter-cell mobility (e.g., L1 and/or L2-centric mobility) and/or a larger number of transmission configuration indicator (TCI) states. For example, the TCI states may include use of a common beam for data and control transmission and reception for UL and DL operations, a unified TCI framework for UL and DL beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of a PHY layer or a MAC layer signaling, as opposed to a higher layer (e.g., a radio resource control (RRC)) signaling.

Figure 4:
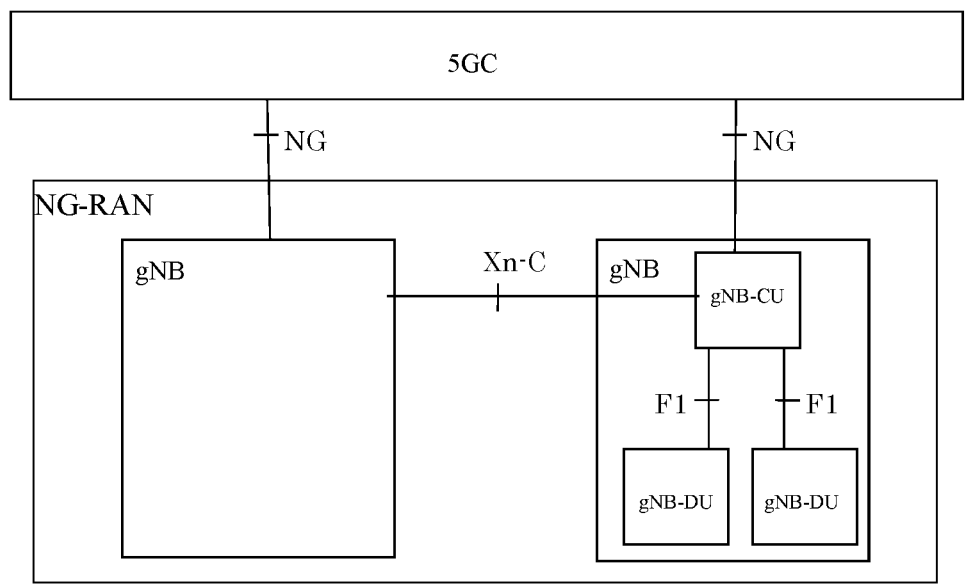
FIG. 4 illustrates an example wireless communication system architecture, in accordance with certain aspects of the present disclosure.

FIG. 4 illustrates an example architecture 400 in which aspects of the present disclosure may be practiced. The architecture 400 includes a gNB central unit (gNB-CU). The gNB-CU serves as a logical node hosting RRC, a service data adaptation protocol (SDAP) and packet data convergence protocol (PDCP) protocols of the gNB that controls the operation of one or more gNB distributed units (gNB-DUs). The gNB-CU terminates an F1 interface connected with the gNB-DUs.

Figure 5:
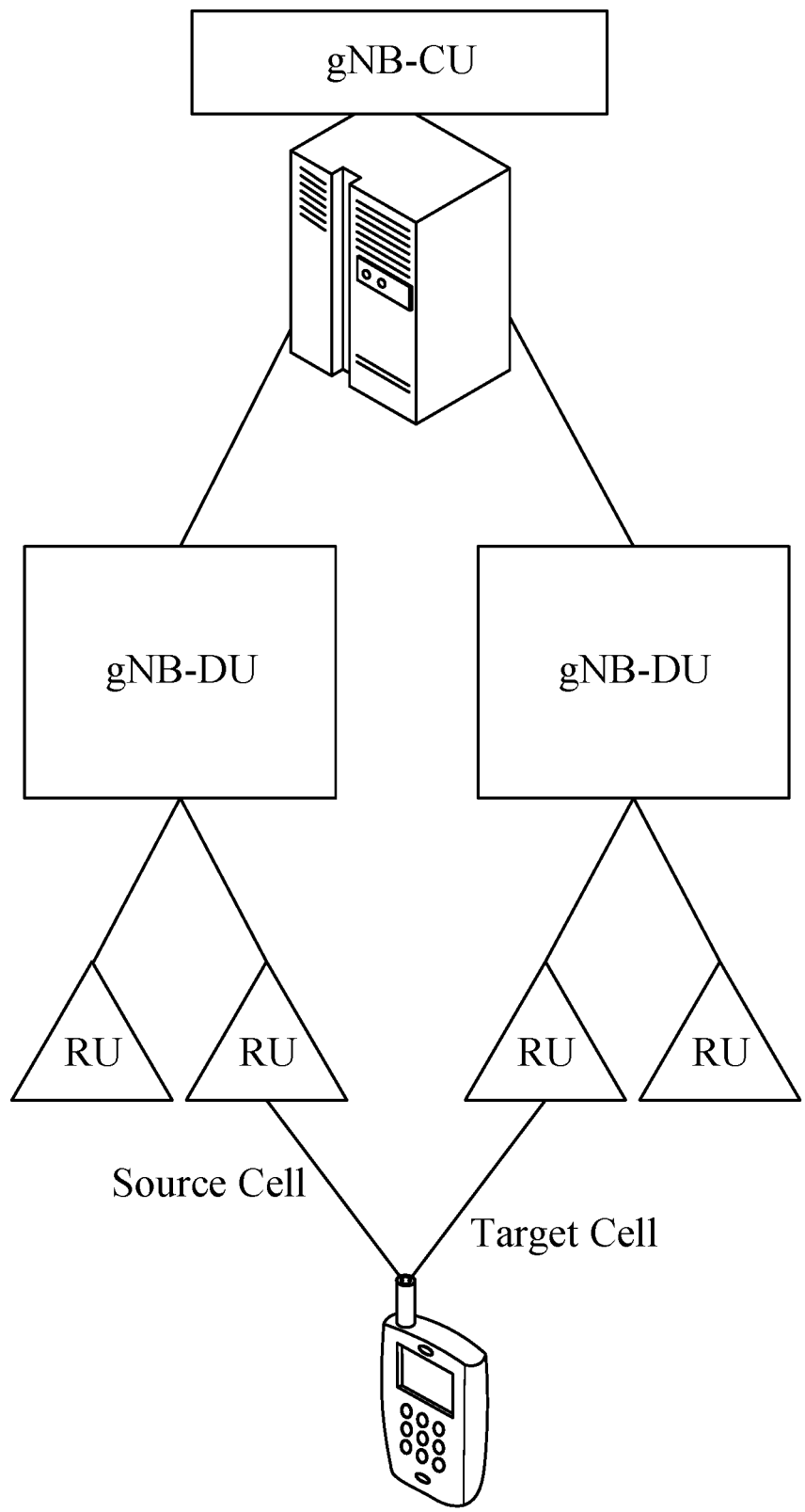
FIGS. 5 and 6 illustrate example scenarios in which aspects of the present disclosure may be practiced.
Figure 6:
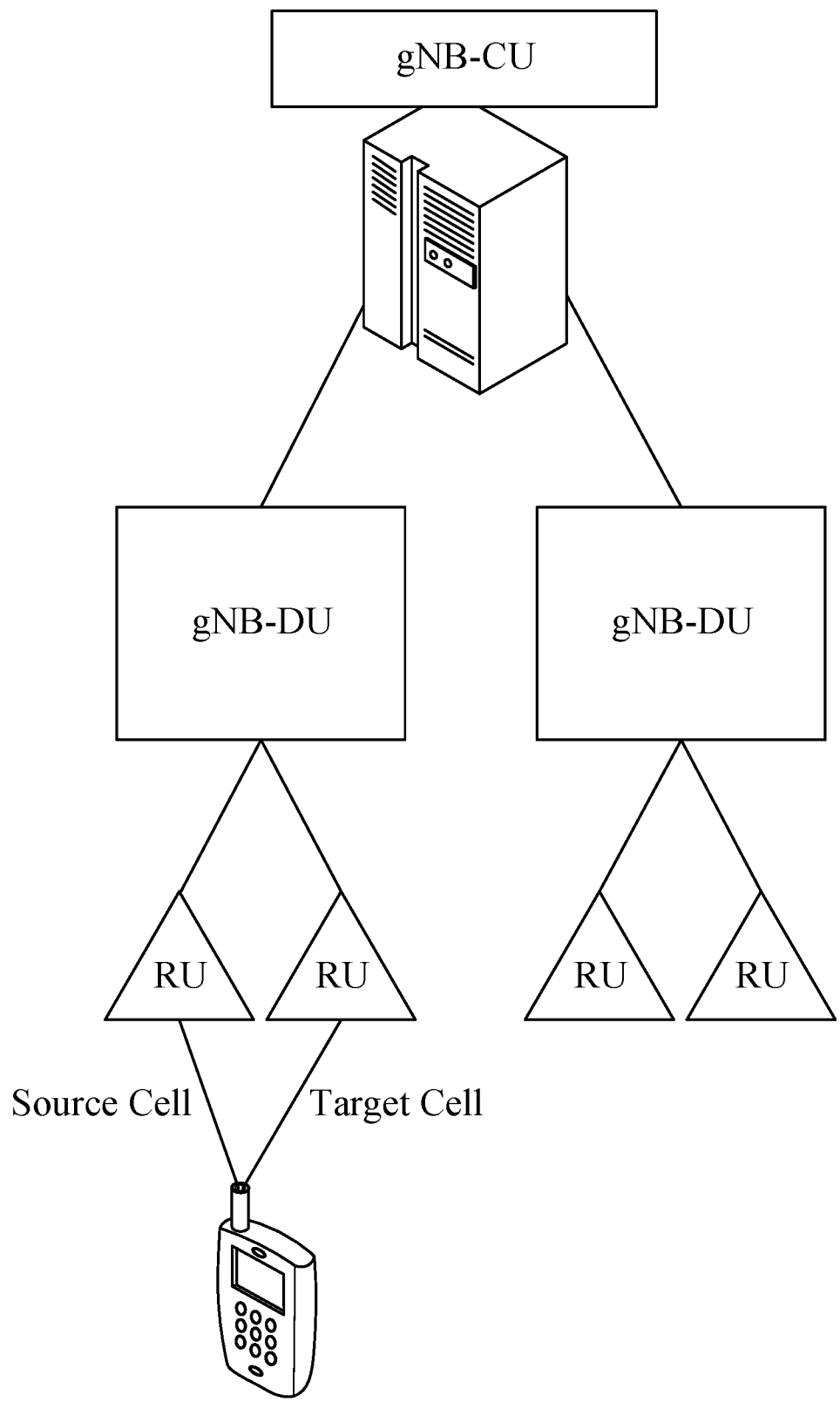

The gNB-DU serves as a logical node hosting radio link control (RLC), MAC and PHY layers of the gNB, and its operation is controlled by the gNB-CU. In some cases, as illustrated in FIGS. 5 and 6, one gNB-DU supports one or multiple cells (but each cell is supported by only one gNB-DU. The gNB-DU terminates the F1 interface connected with the gNB-CU.

As illustrated in FIG. 5, a UE is handed over between (source and target) cells supported by (radio units (RUs) of) different gNB-DUs under a same gNB-CU. The RUs contain only PHY layer logic. In the scenario of FIG. 5, the cells could have non-collocated (in different gNB-DUs) PHY, MAC, and RLC logic, but common PDCP and RRC logic (the same gNB-CU). While L1/L2 signaling techniques described herein may be used for mobility, a data path from PDCP to different RLCs present some control aspects that may be addressed by coordination between the gNB-DUs.

In a scenario illustrated in FIG. 6, on the other hand, source and target cells are supported by (belong to) a same gNB-DU. Accordingly, L1/L2 mobility may be particularly attractive in this scenario, as the cells can share MAC and upper layers (same gNB-DU). In this scenario, when performing a handover via L1/L2 signaling, a data path at a MAC and above stays the same.

As noted above, the distributed RUs contain only PHY layer and may be used (activated/de-activated) in a similar manner to a carrier aggregation (CA), but cells may be on same carrier frequencies. As such, aspects of the present disclosure, however, may utilize mechanisms similar to those used in the CA to enable L1/L2 mobility (e.g., activating/de-activating cells).

As an initial step, RRC signaling may be used to configure a set of cells for L1/L2 mobility. A cell set may be designed to be large enough to cover meaningful mobility (e.g., anticipated mobility of a UE within a given area and a given time). As will be described below, mobility management may be performed by activating/de-activating cells in the cell set.

From a configured set, at any given time, a certain set of cells may be activated. The set of activated cells refers to one or more cells in the configured set that are activated. If the set of activated cells includes two or more activated cells, a UE may be handed over from one activated cell to another activated cell via dynamic (PHY/MAC) signaling.

Which cells are activated for any given UE may depend on UE reported measurements. Configured cells that are not activated (e.g., a set of deactivated cells) may include a (remaining) group of cells in in a configured set that are deactivated (not activated).

Example Target PCI Selection

Aspects of the present disclosure provide apparatus, methods, processing systems, and computer readable mediums for enabling a physical layer (PHY, Layer 1 or L1) or a medium access control (MAC, Layer 2 or L2) 1/layer 2 (L1/L2) inter-cell mobility based on signaling to/from a user equipment (UE). In some cases, L1/L2 signaling may be used to indicate a target physical cell ID (PCI) selected for a handover.

Some features may facilitate an uplink (UL) beam selection for UEs equipped with multiple panels. For example, the UL beam selection may be facilitated through a UL beam indication based on a unified transmission configuration indicator (TCI) framework, enabling simultaneous transmission across multiple panels, and enabling fast panel selection. Further, UE-initiated or L1-event-driven beam management may also reduce latency and a probability that beam failure events occur.

Additional enhancements for multiple transmission and reception points (multi-TRP) deployment may target both FR1 and FR2 bands. These enhancements may improve reliability and robustness for channels other than a physical downlink shared channel (PDSCH) (e.g., a physical downlink control channel (PDCCH), a physical uplink shared channel (PUSCH), and a physical uplink control channel (PUCCH)) using multi-TRP and/or multi-panel operations. These enhancements may, in some cases, be related to quasi co-location (QCI) and TCI that may enable inter-cell multi-TRP operations and may allow for simultaneous multi-TRP transmission with multi-panel reception, assuming multi-DCI-based multi-PDSCH reception.

Still further enhancements may support single frequency networks (SFNs) in high speed environments (e.g., in a high speed train (HST) scenario). These may include QCL assumptions for demodulation reference signals (DMRS), such as multiple QCL assumptions for same DMRS ports and/or targeting downlink (DL)-only transmission. In some cases, the enhancements may specify a QCL or QCL-like relation, including applicable QCL types and associated requirements, between DL and UL signals by using a unified TCI framework.

In Rel-15 and Rel-16, each serving cell may have a radio resource control (RRC)-configured serving cell ID and an RRC-configured physical cell indicator (PCI). A UE may also acquire a physical cell identifier from a synchronization signal block (SSB) of a serving cell.

To enable L1/L2 based inter-cell mobility, a gNB may need to know whether a UE supports L1/L2 mobility. The L1/L2 based inter-cell mobility may include various operating modes. In a first operating mode, each serving cell can have a PCI and multiple physical cell sites (e.g., remote radio headers (RRHs)). Each RRH may transmit a different set of SSB IDs using a same PCI. A DCI or MAC control element (MAC-CE) may select which RRH or corresponding SSB to serve the UE based on signal strength metrics (e.g., reference signal received power (RSRP) per reported SSB ID.

In another operating mode, each serving cell may be configured with multiple PCIs. Each RRH of a serving cell can use one of multiple PCIs configured for the serving cell and can transmit a full set of SSB IDs configured for the serving cell. A DCI or MAC-CE can select which RRH(s) or corresponding PCI(s) and/or SSB(s) to serve a UE based on signal strength metrics (e.g., RSRP) per reported SSB ID per reported PCI.

In still another operating mode, each serving cell may be configured with a single PCI. A DCI or MAC-CE can identify serving cell(s) or corresponding serving cell ID(s) to serve a UE based on signal strength metrics (e.g., RSRP) pre reported SSB ID per reported PCI.

While the above refers to selection or use of SSBs, it should be understood that other cell-identifying reference signals (RSs) may be used to identify a serving cell to serve a UE. For example, channel state information (CSI) RSs (CSI-RSs) or positioning RSs (PRSs) can be used to identify serving cell(s) to serve the UE.

In some embodiments, in L1/L2 inter-cell mobility, a UE may be configured with multiple candidate cells (e.g., PCIs) for L1 metric measurement and reporting. L1 metric measurement and reporting may waste power in situations where a UE is stationary or substantially stationary. The UE may continue to report L1 metrics while stationary, and the UE may take some time before a gNB determines, based on the reported L1 metrics, that the UE is stationary.

Example CA/DC Reconfiguration in L1/L2 Based Inter-Cell Mobility

Aspects of the present disclosure relate to wireless communications, and more particularly, to techniques for a cell group reconfiguration that support inter-cell mobility based on a physical layer (PHY, Layer 1 or L1) or a medium access control (MAC, Layer 2 or L2) 1/layer 2 (L1/L2) signaling. For example, the techniques presented herein may be applied, for example, to setup, update, and/or release cell groups (CGs) in carrier aggregation (CA) and/or dual connectivity (DC) configurations.

To reduce handover (HO) latency, L1/L2 based inter-cell mobility was introduced (in Rel-17). In L1/L2 based HO, each serving cell may have multiple physical cell identifiers (PCIs) for remote radio headers (RRH), which may be at different physical locations. A gNB may dynamically select a subset of PCIs of a same serving cell to serve a user equipment (UE) via L1/L2 signaling (e.g., a downlink control information (DCI) or a MAC control element (MAC-CE)). In another implementation, each serving cell may have a single PCI (e.g., as defined in a specification of each serving cell). A gNB may dynamically select at least one serving cell to serve the UE via the L1/L2 signaling.

Furthermore, random access channel (RACH) based L1/L2 inter-cell mobility may be implemented in the above examples. In such cases, the UE may select the PCI(s) and initiates the RACH to selected PCI(s) if a HO condition is satisfied for the selected PCI(s), instead of the gNB selecting the PCI(s). For example, multiple candidate target PCIs can be pre-configured to the UE by the gNB.

The gNB may also configure the UE to measure an L1 metric per candidate target PCI. The L1 metric may include L1 reference signal received power (RSRP) and/or L1 signal-to-interference-plus-noise-ratio (L1-SINR). The gNB may further configure at least one HO condition per candidate target PCI. The HO condition may take the L1 metric as input, for example.

Whenever the HO condition is satisfied for a candidate target PCI, the UE may initiate a reconfiguration with a synchronization (e.g., via a RACH) on an uplink (UL) resource configured for the candidate target PCI. Completion of the RACH based L1/L2 HO may be indicated via a HO complete message signaled via L1/L2 signaling. This HO complete message may be sent from the UE to the RRH and/or a cell associated with the candidate target PCI. Alternatively, the HO complete message may be received by the UE.

One potential issue to address for L1/L2 based PCI(s) selection, in cases involving CA and/or DC, is the speed at which the CA and/or the DC (a CG and/or a component carrier (CC)) configurations associated with source/target PCI(s) are updated/modified. The types of modifications that may be needed may be understood with reference to an example CA scenario.

With CA, a single CG may include a primary cell (PCell) and one or more secondary cells (SCells). In one example scenario, before L1/L2 based PCI(s) selection, a UE may be served in the CA with CC1 as the PCell associated with PCI1 and with CC2 & CC3 as SCells, which may all be configured at a first RRH (RRH 1). After L1/L2 based PCI(s) selection, however, the UE may be served in the CA with CC4 as a PCell (associated with PCI2) and with CC5, CC6, and CC7 as SCells, which are all configured at a second RRH (RRH 2).

In this example scenario, to take advantage of the reduced latency achieved via the L1/L2 mobility signaling, the UE should be able to quickly release/deactivate the CCs (CC1-CC3) in the original CA configuration (e.g., before the PCI selection command), and quickly setup/activate the CCs (CC4-CC7) in the new CA configuration (e.g., after the PCI selection command).

In addition (or as an alternative) to CA, a UE may operate with a DC configuration before and/or after L1/L2 based inter-cell mobility. With DC multiple CGs may include a master CG (MCG), with a PCell and one or more SCells, and a secondary CG (SCG) with a primary SCell (PSCell) and one or more SCells. Thus, a similar potential issue, as described above with respect to CA, is the timing of release/deactivation of the original DC configuration, and setup/activation of the new DC configuration.

Aspects or the present disclosure provide techniques for a modification of a CG (e.g., a CA and/or a DC) configuration in wireless systems that support L1/L2 signaling based inter-cell mobility. As will be described, in some cases, information for updating the CA/DC configuration may be signalled implicitly to a UE. In other cases, the information for updating the CA/DC configuration may be signalled explicitly to the UE.

Figure 7:
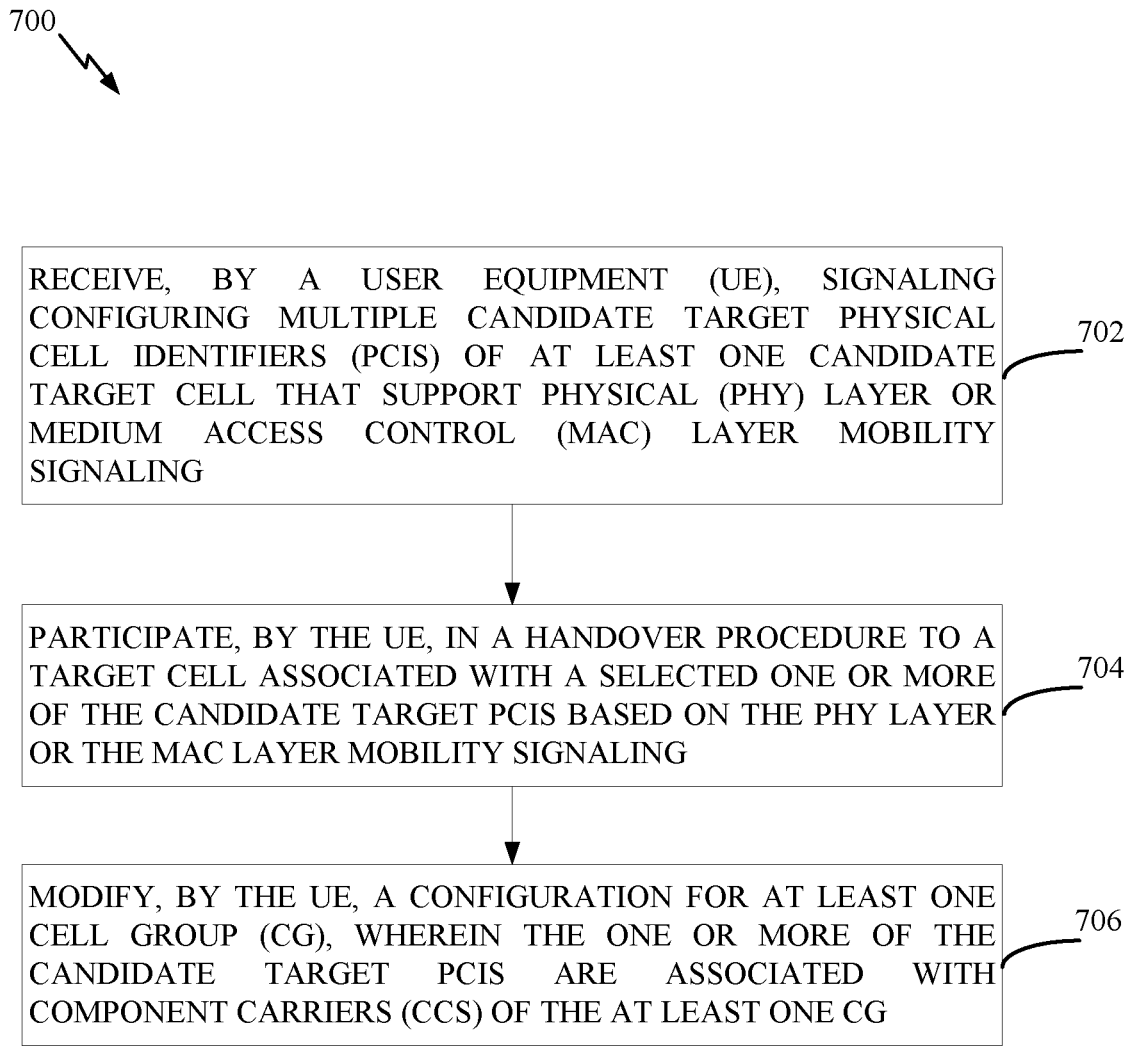
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as the UE 120a in the wireless communication network 100 of FIG. 1) to modify CA/DC configurations in L1/L2-based inter-cell mobility. The operations 700 may be implemented as software components that are executed and run on one or more processors (e.g., the controller/processor 280 of FIG. 2). Further, the transmission and reception of signals by the UE in operations 700 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 700 begin, at 702, by receiving signaling configuring multiple candidate target PCIs of at least one candidate target cell that support PHY layer or MAC layer mobility signaling. For example, the UE may receive the signaling using antenna(s) and receiver/transceiver components of the UE 120a shown in FIG. 1 or FIG. 2 and/or of the apparatus shown in FIG. 9.

At 704, the UE participates in a HO procedure to a target cell associated with a selected one or more of the candidate target PCIs based on the PHY layer or the MAC layer mobility signaling. For example, the UE may participate in the HO procedure using a processor and/or antenna(s) of the UE 120a shown in FIG. 1 or FIG. 2 and/or of the apparatus shown in FIG. 9.

At 706, the UE modifies a configuration for at least one CG, wherein the one or more of the candidate target PCIs are associated with CCs of the at least one CG. For example, the UE may modify the configuration for the at least one CG using a processor of the UE 120a shown in FIG. 1 or FIG. 2 and/or of the apparatus shown in FIG. 9.

Figure 8:
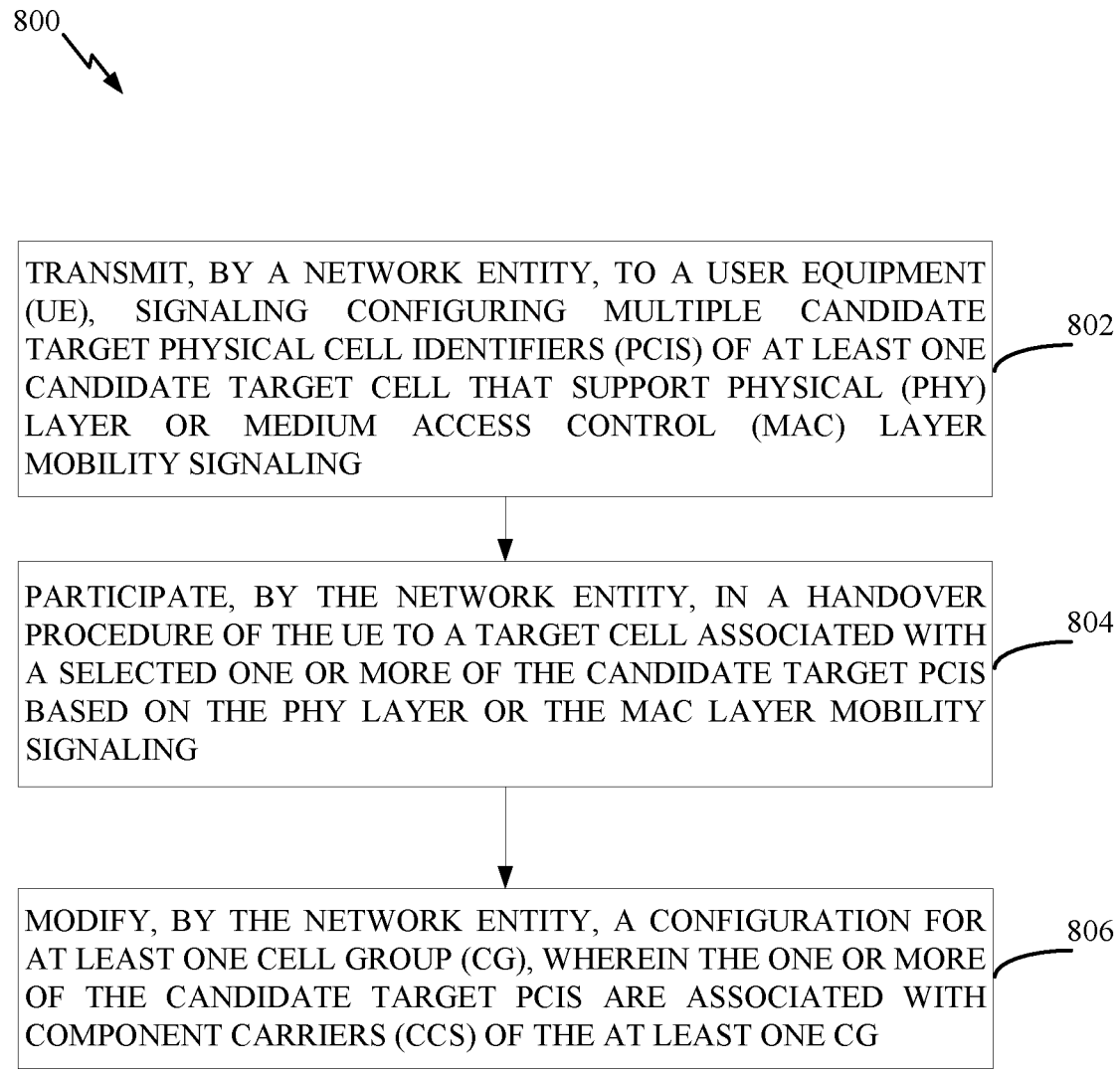
FIG. 8 is a flow diagram illustrating example operations for wireless communication by a network entity, in accordance with certain aspects of the present disclosure.

FIG. 8 is a flow diagram illustrating example operations 800 for wireless communication, in accordance with certain aspects of the present disclosure. For example, the operations 800 may be performed by a network entity (e.g., such as the BS 110a in the wireless communication network 100 of FIG. 1) that provide L1/L2 signaling to a UE. The operations 800 may be implemented as software components that are executed and run on one or more processors (e.g., the controller/processor 240 of FIG. 2). Further, the transmission and reception of signals by the BS in operations 800 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 800 begin, at 802, by transmitting, to the UE, signaling configuring multiple candidate target PCIs of at least one candidate target cell that support PHY layer or MAC layer mobility signaling. For example, the network entity may send the signaling using antenna(s) and transmitter/transceiver components of the BS 110a shown in FIG. 1 or FIG. 2 and/or of the apparatus shown in FIG. 10.

At 804, the network entity participates in a HO procedure of the UE to a target cell associated with a selected one or more of the candidate target PCIs based on the PHY layer or the MAC layer mobility signaling. For example, the network entity may participate in the HO procedure using a processor and antenna(s) of the BS 110a shown in FIG. 1 or FIG. 2 and/or of the apparatus shown in FIG. 10.

At 806, the network entity modifies a configuration for at least one CG, wherein the one or more of the candidate target PCIs are associated with CCs of the at least one CG. For example, the network entity may modify the configuration for the at least one CG using a processor of the BS 110a shown in FIG. 1 or FIG. 2 and/or of the apparatus shown in FIG. 10.

In certain aspects, when a CA configuration is being modified, there may be only a single CG (e.g., an MCG). In such cases, the CA configuration may include a PCell configuration and an individual SCell configuration in the MCG. In some examples, each selected PCI may be associated with one CC in the MCG (e.g., a PCell or SCell in the MCG).

In certain aspects, when a DC configuration is being modified, there may be an MCG and a SCG, while the DC configuration may include a special cell (SPCell) configuration and an individual SCell configuration in each CG. In this case, each selected PCI may be associated with one CC in one of the two CGs (e.g., the SPCell in the MCG or the SCG).

In certain aspects, a modification of a CA/DC configuration may be implicitly indicated to a UE. In other words, messages for L1/L2 based inter-cell mobility, including a PCI(s) selection command, may not include an explicit signaling of the modified configuration.

As an example of an implicit indication case, the CA/DC configuration may be same regardless of which PCI(s) is/are selected to serve the UE. Accordingly, there may be no signaling of the modified CA/DC configuration after the PCI(s) is/are re-selected. For example, when multiple PCIs per serving cell are configured in L1/L2 mobility, every RRH associated with each candidate PCI may have the same CA/DC configuration.

In certain aspects, the CA/DC configuration may be different across PCIs and may be preconfigured to a UE for each PCI. In such cases, when new PCI(s) is/are selected, the UE may automatically apply one or more corresponding CA/DC configurations. Accordingly, there may be no explicit signaling of the modified CA/DC configuration to the UE. For example, for multiple PCIs per serving cell in L1/L2 mobility, every RRH associated with each candidate PCI may have its own CA/DC configuration, which may be preconfigured to the UE.

In the case of CA, the (e.g., two) preconfigured CA configurations for any two PCIs may be identical or different. In case of DC, the two preconfigured DC configuration for any two PCIs may be identical, and may be different for only one of the two CGs (e.g., for the MCG or SCG), or different for both CGs.

In certain aspects, a modification of CA/DC configuration is explicitly indicated to a UE. For example, the explicit indication of the CA/DC configuration may be provided in L1/L2 signaling (e.g., a DCI or a MAC-CE) including a PCI(s) selection command.

In some examples, the configuration of individual CCs and/or CGs in the CA/DC configuration may be preconfigured to the UE. In such cases, when the corresponding PCI(s) is/are reselected, a status and/or role of each corresponding CC/CG may be dynamically indicated to the UE.

Examples of a CC/CG status may include an activated status, a deactivated status, an entering cell status, a leaving cell status, a CG dormancy state status, or a released status. In some cases, the role for a CC may be a PCell in an MCG, a primary secondary cell (PSCell) in an SCG, and/or a SCell in an MCG or SCG. In some cases, the role of each CG may be MCG or SCG.

In some cases, for each CC/CG not (explicitly) indicated to the UE to update a corresponding status and/or role, a default status and/or role may be predefined. For example, the default status may be a current status, a deactivated status, an activated status, an entering dormancy state status, a leaving dormancy state status, or a released status, while an example default role may be a current role.

In certain aspects, when the PCI(s) is/are reselected, the configuration of at least one CC/CG may be dynamically modified or added to the UE. In other words, the configuration of the at least one CC/CG itself may change. For example, the CC configuration may include a configuration of operating parameters such as bandwidth, bandwidth part (BWP), synchronization signal block (SSB), a RACH, a physical downlink control channel (PDCCH), a physical downlink shared channel (PDSCH), a physical uplink control channel (PUCCH), or a reference signal (RS) configuration. In some examples, the CG configuration may include a number of CCs in the CG, the role of each CC, and/or the role of the CG.

In certain aspects, the dynamic modification of the configuration may be implemented in conjunction with pre-configuration of CA/DC configurations described above.

Example Wireless Communication Devices

Figure 9:
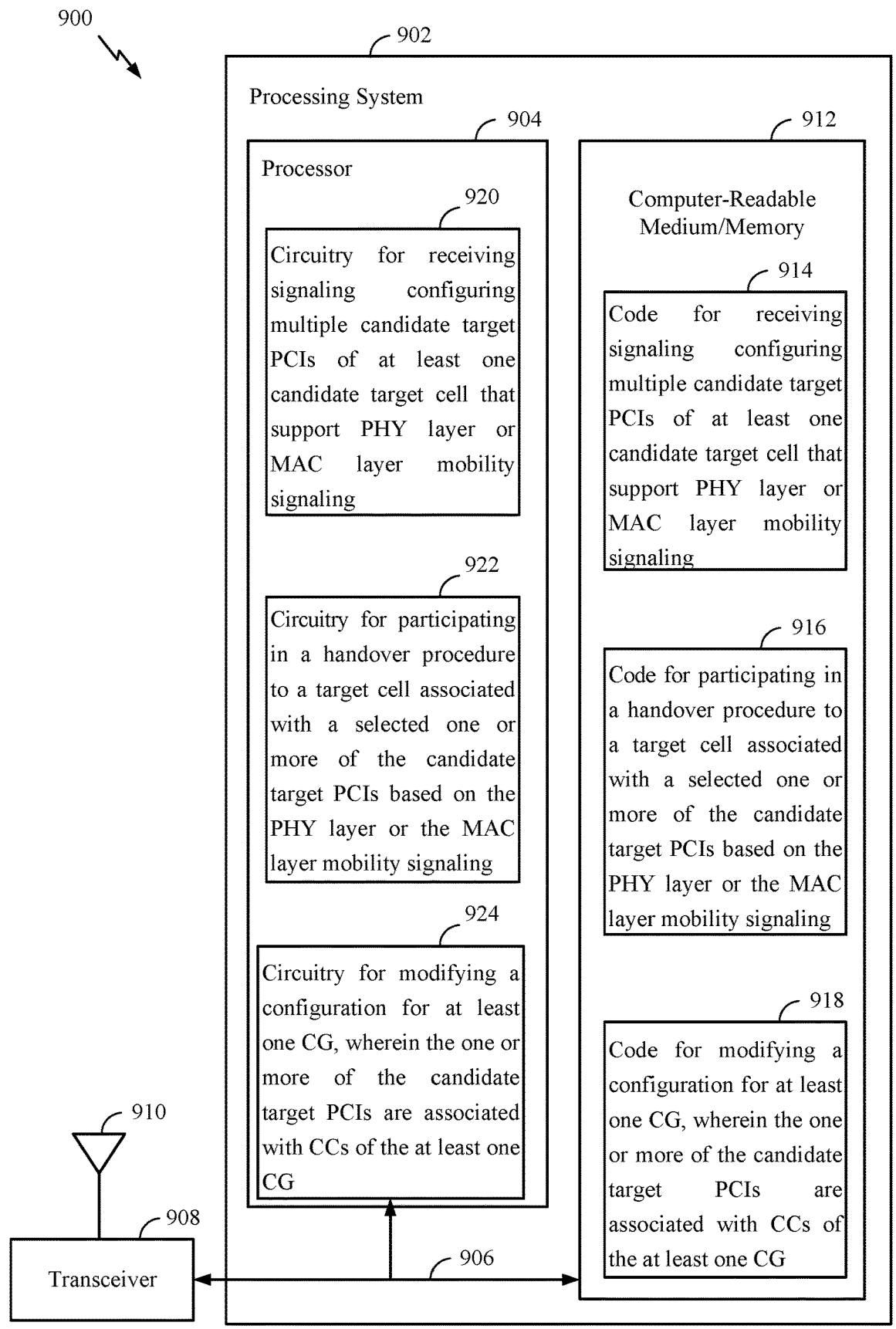
FIG. 9 illustrates a communications device that may include various components configured to perform operations for the techniques disclosed herein, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 is configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein. In certain aspects, computer-readable medium/memory 912 stores code 914 for receiving, code 916 for participating, and code 918 for modifying. The code 914 for receiving may include code for receiving signaling configuring multiple candidate target physical cell identifiers (PCIs) of at least one candidate target cell that support physical (PHY) layer or medium access control (MAC) layer mobility signaling. The code 916 for participating may include code for participating in a handover procedure to a target cell associated with a selected one or more of the candidate target PCIs based on the PHY layer or the MAC layer mobility signaling. The code 918 for modifying may include code for modifying a configuration for at least one cell group (CG) where the one or more of the candidate target PCIs are associated with component carriers (CCs) of the at least one CG.

The processor 904 may include circuitry configured to implement the code stored in the computer-readable medium/memory 912, such as for performing the operations illustrated in FIG. 7, as well as other operations for performing the various techniques discussed herein. For example, the processor 904 includes circuitry 920 for receiving, circuitry 922 for participating, and circuitry 924 for modifying. The circuitry 920 for receiving may include circuitry for receiving signaling configuring multiple candidate target PCIs of at least one candidate target cell that support PHY layer or MAC layer mobility signaling. The circuitry 922 for participating may include circuitry for participating in a handover procedure to a target cell associated with a selected one or more of the candidate target PCIs based on the PHY layer or the MAC layer mobility signaling. The circuitry 924 for modifying may include circuitry for modifying a configuration for at least one CG where the one or more of the candidate target PCIs are associated with CCs of the at least one CG.

Figure 10:
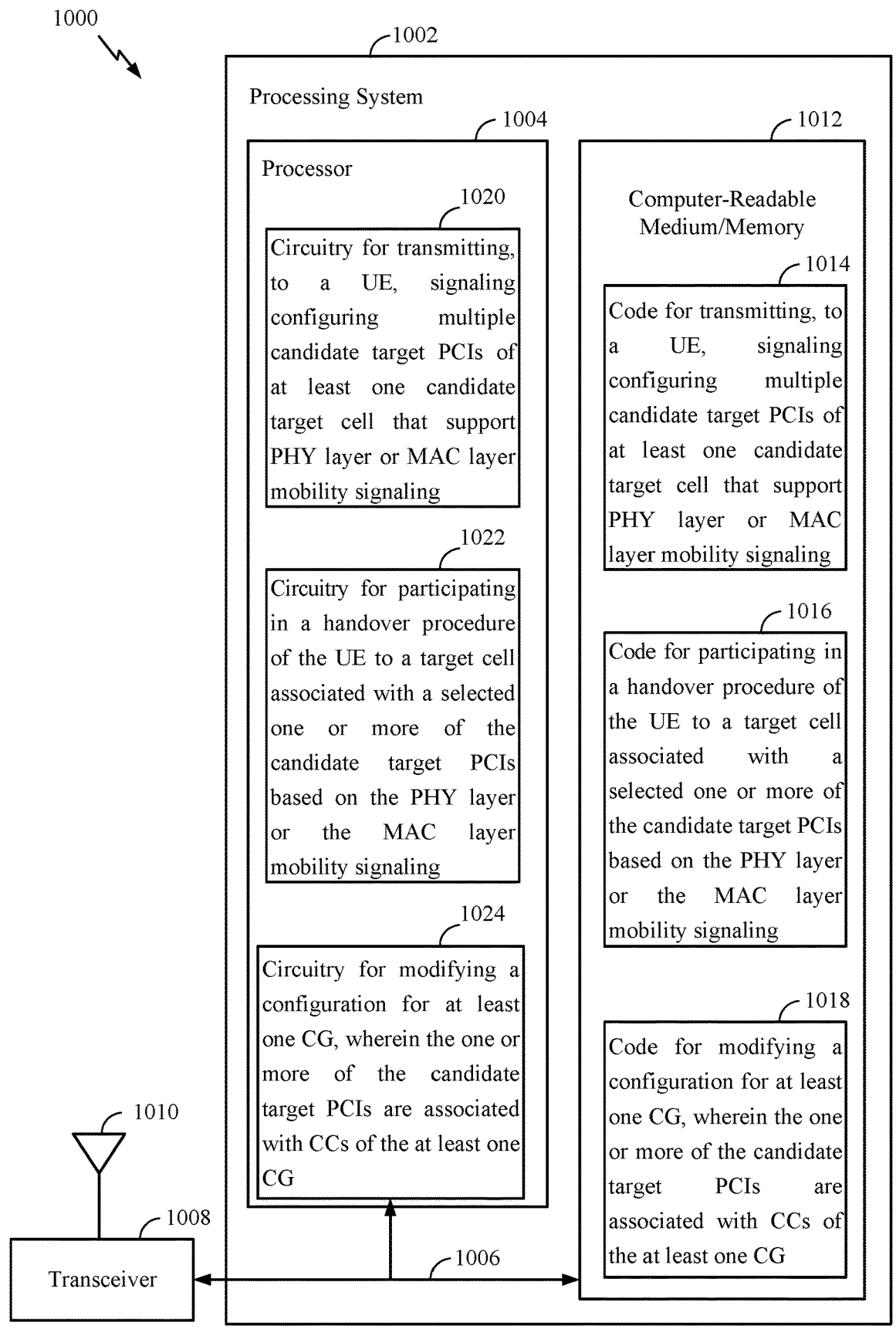
FIG. 10 illustrates a communications device that may include various components configured to perform operations for the techniques disclosed herein, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 is configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein. In certain aspects, computer-readable medium/memory 1012 stores code 1014 for transmitting, code 1016 for participating, and code 1018 for modifying. The code 1014 for transmitting may include code for transmitting, to a UE, signaling configuring multiple candidate target PCIs of at least one candidate target cell that support PHY layer or MAC layer mobility signaling. The code 1016 for participating may include code for participating in a handover procedure of the UE to a target cell associated with a selected one or more of the candidate target PCIs based on the PHY layer or the MAC layer mobility signaling. The code 1018 for modifying may include code for modifying a configuration for at least one CG where the one or more of the candidate target PCIs are associated with CCs of the at least one CG.

The processor 1004 may include circuitry configured to implement the code stored in the computer-readable medium/memory 1012, such as for performing the operations illustrated in FIG. 8, as well as other operations for performing the various techniques discussed herein. For example, the processor 1004 includes circuitry 1020 for transmitting, circuitry 1022 for participating, and circuitry 1024 for modifying. The circuitry 1020 for transmitting may include circuitry for transmitting, to a UE, signaling configuring multiple candidate target PCIs of at least one candidate target cell that support PHY layer or MAC layer mobility signaling. The circuitry 1022 for participating may include circuitry for participating in a handover procedure of the UE to a target cell associated with a selected one or more of the candidate target PCIs based on the PHY layer or the MAC layer mobility signaling. The circuitry 1024 for modifying may include circuitry for modifying a configuration for at least one CG where the one or more of the candidate target PCIs are associated with CCs of the at least one CG.

Example Aspects

Implementation examples are described in the following numbered clauses:

In a first aspect, a method for wireless communications by a user equipment (UE), comprising: receiving signaling configuring multiple candidate target physical cell identifiers (PCIs) of at least one candidate target cell that support physical (PHY) layer or medium access control (MAC) layer mobility signaling; participating in a handover procedure to a target cell associated with a selected one or more of the candidate target PCIs based on the PHY layer or the MAC layer mobility signaling; and modifying a configuration for at least one cell group (CG), wherein the one or more of the candidate target PCIs are associated with component carriers (CCs) of the at least one CG.

In a second aspect, alone or in combination with the first aspect, information for modifying the configuration is implicitly indicated to UE.

In a third aspect, alone or in combination with one or more of the first and second aspects, the multiple candidate target PCIs share a common configuration for at least one of carrier aggregation (CA) or dual connectivity (DC); and modifying the configuration comprises updating the PCIs associated with the component carriers (CCs) of the at least one CG based on the one or more candidate target PCIs associated with the target cell.

In a fourth aspect, alone or in combination with one or more of the first through third aspects, receiving signaling preconfiguring the UE with different configurations for at least one of carrier aggregation (CA) or dual connectivity (DC) for the multiple candidate target PCIs; and modifying the configuration comprises applying one or more preconfigured configurations for the one or more candidate target PCIs associated with the target cell.

In a fifth aspect, alone or in combination with one or more of the first through fourth aspects, multiple PCIs are associated with the target cell.

In a sixth aspect, alone or in combination with one or more of the first through fifth aspects, the pre-configured configurations comprise: a same preconfigured CA configuration for at least two of the PCIs associated with the target cell and the source cell; or different preconfigured CA configurations for at least two of the PCIs associated with the target cell and the source cell.

In a seventh aspect, alone or in combination with one or more of the first through sixth aspects, the pre-configured configurations comprise: a same preconfigured DC configuration for at least two of the PCIs associated with the target cell and the source cell; different preconfigured DC configurations for at least two of the PCIs associated with the target cell and the source cell associated with a master cell group (MCG); or different preconfigured DC configurations for at least two of the PCIs associated with the target cell and the source cell associated with a secondary cell group (SCG).

In an eighth aspect, alone or in combination with one or more of the first through seventh aspects, information for modifying the configuration is signaled to the UE; and the UE modifies the configuration based on the signaled information.

In a ninth aspect, alone or in combination with one or more of the first through eighth aspects, the information is conveyed via at least one of a downlink control information (DCI) or a MAC control element (MAC-CE).

In a tenth aspect, alone or in combination with one or more of the first through ninth aspects, receiving signaling preconfiguring the UE with different configurations for at least one of carrier aggregation (CA) or dual connectivity (DC) for individual component carriers (CCs) or cell groups (CGs); and the information for modifying the configuration signaled to the UE indicates at least one of an updated status or role of one or more CCs or CGs.

In an eleventh aspect, alone or in combination with one or more of the first through tenth aspects, the updated status comprises at least one of activated, de-activated, entering cell, leaving cell, cell group dormancy state, or released.

In a twelfth aspect, alone or in combination with one or more of the first through eleventh aspects, the updated role for a CC comprises at least one of a primary cell (PCell) in a master cell group (MCG), a primary secondary cell (PSCell) in a secondary cell group (SCG), or a secondary cell (SCell) in an MCG or SCG.

In a thirteenth aspect, alone or in combination with one or more of the first through twelfth aspects, the updated role for a CG comprises a master cell group (MCG) or secondary cell group (SCG).

In a fourteenth aspect, alone or in combination with one or more of the first through thirteenth aspects, applying a default status or role to one or more CCs or CGs for which an updated status or role is not provided to the UE.

In a fifteenth aspect, alone or in combination with one or more of the first through fourteenth aspects, for at least one of the CCs or CGs, applying the default status or role comprises maintaining a current status or role.

In a sixteenth aspect, alone or in combination with one or more of the first through fifteenth aspects, the network entity indicates the selected one or more of the candidate target PCIs in a selection command signaled via PHY layer or MAC layer signaling; and the network entity also indicates a change to a configuration for at least one of carrier aggregation (CA) or dual connectivity (DC) for one or more individual component carriers (CCs) or cell groups (CGs) associated with the selected candidate target PCIs.

In a seventeenth aspect, alone or in combination with one or more of the first through sixteenth aspects, the change to the configuration comprises a change to at least one of a number of CCs in a CG, a role of one or more CCs in the CG, or a role of the CG.

In an eighteenth aspect, alone or in combination with one or more of the first through seventeenth aspects, the change to the configuration comprises a change to at least one of an operating bandwidth, bandwidth part (BWP), synchronization signal block (SSB), random access channel (RACH), physical downlink control channel (PDCCH), physical downlink shared channel (PDSCH), physical uplink control channel (PUCCH), or a reference signal (RS) configuration.

In a nineteenth aspect, alone or in combination with one or more of the first through eighteenth aspects, receiving signaling preconfiguring the UE with different configurations for at least one of CA or DC for individual CCs or CGs; and the UE at least occasionally modifies the configuration for at least one CG or CC based on one or more of the preconfigured configurations.

In a twentieth aspect, a method for wireless communications by a network entity, comprising: transmitting, to a user equipment (UE), signaling configuring multiple candidate target physical cell identifiers (PCIs) of at least one candidate target cell that support physical (PHY) layer or medium access control (MAC) layer mobility signaling; participating in a handover procedure of the UE to a target cell associated with a selected one or more of the candidate target PCIs based on the PHY layer or the MAC layer mobility signaling; and modifying a configuration for at least one cell group (CG), wherein the one or more of the candidate target PCIs are associated with component carriers (CCs) of the at least one CG.

In a twenty-first aspect, alone or in combination with the twentieth aspect, information for modifying the configuration is implicitly indicated to UE.

In a twenty-second aspect, alone or in combination with one or more of the twentieth and twenty-first aspects, the multiple candidate target PCIs share a common configuration for at least one of carrier aggregation (CA) or dual connectivity (DC); and modifying the configuration comprises updating the PCIs associated with the component carriers (CCs) of the at least one CG based on the one or more candidate target PCIs associated with the target cell.

In a twenty-third aspect, alone or in combination with one or more of the twentieth through twenty-second aspects, sending the UE signaling preconfiguring the UE with different configurations for at least one of carrier aggregation (CA) or dual connectivity (DC) for the multiple candidate target PCIs; and modifying the configuration comprises applying one or more preconfigured configurations for the one or more candidate target PCIs associated with the target cell.

In a twenty-fourth aspect, alone or in combination with one or more of the twentieth through twenty-third aspects, multiple PCIs are associated with the target cell.

In a twenty-fifth aspect, alone or in combination with one or more of the twentieth through twenty-fourth aspects, the pre-configured configurations comprise: a same preconfigured CA configuration for at least two of the PCIs associated with the target cell and the source cell; or different preconfigured CA configurations for at least two of the PCIs associated with the target cell and the source cell.

In a twenty-sixth aspect, alone or in combination with one or more of the twentieth through twenty-fifth aspects, the pre-configured configurations comprise: a same preconfigured DC configuration for at least two of the PCIs associated with the target cell and the source cell; different preconfigured DC configurations for at least two of the PCIs associated with the target cell and the source cell associated with a master cell group (MCG); or different preconfigured DC configurations for at least two of the PCIs associated with the target cell and the source cell associated with a secondary cell group (SCG).

In a twenty-seventh aspect, alone or in combination with one or more of the twentieth through a twenty-sixth aspects, information for modifying the configuration is signaled to the UE; and the UE modifies the configuration based on the signaled information.

In a twenty-eighth aspect, alone or in combination with one or more of the twentieth through twenty-seventh aspects, the information is conveyed via at least one of a downlink control information (DCI) or a MAC control element (MAC-CE).

In a twenty-ninth aspect, alone or in combination with one or more of the twentieth through twenty-eighth aspects, sending the UE signaling preconfiguring the UE with different configurations for at least one of carrier aggregation (CA) or dual connectivity (DC) for individual component carriers (CCs) or cell groups (CGs); and the information for modifying the configuration signaled to the UE indicates at least one of an updated status or role of one or more CCs or CGs.

In a thirtieth aspect, alone or in combination with one or more of the twentieth through twenty-ninth aspects, the updated status comprises at least one of activated, de-activated, entering cell, leaving cell, cell group dormancy state, or released.

In a thirty-first aspect, alone or in combination with one or more of the twentieth through thirtieth aspects, the updated role for a CC comprises at least one of a primary cell (PCell) in a master cell group (MCG), a primary secondary cell (PSCell) in a secondary cell group (SCG), or a secondary cell (SCell) in an MCG or SCG.

In a thirty-second aspect, alone or in combination with one or more of the twentieth through thirty-first aspects, the updated role for a CG comprises a master cell group (MCG) or secondary cell group (SCG).

In a thirty-third aspect, alone or in combination with one or more of the twentieth through thirty-second aspects, applying a default status or role to one or more CCs or CGs for which an updated status or role is not provided to the UE.

In a thirty-fourth aspect, alone or in combination with one or more of the twentieth through thirty-third aspects, for at least one of the CCs or CGs, applying the default status or role comprises maintaining a current status or role.

In a thirty-fifth aspect, alone or in combination with one or more of the twentieth through thirty-fourth aspects, the network entity indicates the selected one or more of the candidate target PCIs in a selection command signaled via PHY layer or MAC layer signaling; and the network entity also indicates a change to a configuration for at least one of carrier aggregation (CA) or dual connectivity (DC) for one or more individual component carriers (CCs) or cell groups (CGs) associated with the selected candidate target PCIs.

In a thirty-sixth aspect, alone or in combination with one or more of the twentieth through thirty-fifth aspects, the change to the configuration comprises a change to at least one of a number of CCs in a CG, a role of one or more CCs in the CG, or a role of the CG.

In a thirty-seventh aspect, alone or in combination with one or more of the twentieth through thirty-sixth aspects, the change to the configuration comprises a change to at least one of an operating bandwidth, bandwidth part (BWP), synchronization signal block (SSB), random access channel (RACH), physical downlink control channel (PDCCH), physical downlink shared channel (PDSCH), physical uplink control channel (PUCCH), or a reference signal (RS) configuration.

In a thirty-eighth aspect, alone or in combination with one or more of the twentieth through thirty-seventh aspects, receiving signaling preconfiguring the UE with different configurations for at least one of CA or DC for individual CCs or CGs; and the UE at least occasionally modifies the configuration for at least one CG or CC based on one or more of the preconfigured configurations.

An apparatus for wireless communication, comprising at least one processor; and a memory coupled to the at least one processor, the memory comprising code executable by the at least one processor to cause the apparatus to perform the method of any of the first through thirty-eighth aspects.

An apparatus comprising means for performing the method of any of the first through thirty-eighth aspects.

A computer readable medium storing computer executable code thereon for wireless communications that, when executed by at least one processor, cause an apparatus to perform the method of any of the first through thirty-eighth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communications by a user equipment (UE), comprising:
   memory comprising instructions; and
   one or more processors configured, individually or in any combination, to execute the instructions and cause the apparatus to:
   receive, from a network entity, signaling configuring multiple candidate target physical cell identifiers (PCIs) of a candidate target cell;
   receive, from the network entity, a medium access control (MAC) layer mobility signaling indicating a selection of one or more of the candidate target PCIs; and
   participate in a handover procedure to a target cell associated with the selected one or more of the candidate target PCIs based on the MAC layer mobility signaling.

2. The apparatus of claim 1, wherein:
   information for modifying a configuration for at least one cell group (CG) is implicitly indicated to the UE;
   the multiple candidate target PCIs share a common configuration for at least one of a carrier aggregation (CA) or a dual connectivity (DC); and
   the configuration is modified by updating the candidate target PCIs associated with component carriers (CCs) of the at least one CG based on the one or more candidate target PCIs associated with the target cell.

3. The apparatus of claim 2, wherein the one or more processors are configured, individually or in any combination, to execute the instructions and cause the apparatus to:
   receive signaling preconfiguring the UE with different configurations for at least one of CA or DC for the multiple candidate target PCIs; and
   modify the configuration by applying one or more preconfigured configurations for the one or more candidate target PCIs associated with the target cell.

4. The apparatus of claim 3, wherein multiple PCIs are associated with the target cell, and wherein the one or more preconfigured configurations comprise:
   a same preconfigured CA configuration for at least two of the PCIs associated with the target cell and a source cell;
   different preconfigured CA configurations for at least two of the PCIs associated with the target cell and the source cell;
   a same preconfigured DC configuration for at least two of the PCIs associated with the target cell and the source cell;
   different preconfigured DC configurations for at least two of the PCIs associated with the target cell and the source cell associated with a master cell group (MCG); or
   different preconfigured DC configurations for at least two of the PCIs associated with the target cell and the source cell associated with a secondary cell group (SCG).

5. The apparatus of claim 1, wherein:
information for modifying a configuration for at least one cell group (CG) is signaled to the UE via at least one of a downlink control information (DCI) or a MAC control element (MAC-CE); and
the one or more processors are configured, individually or in any combination, to execute the instructions and cause the apparatus to modify the configuration based on the information.

6. The apparatus of claim 5, wherein the one or more processors are configured, individually or in any combination, to execute the instructions and cause the apparatus to:
receive signaling preconfiguring the UE with different configurations for at least one of CA or DC for individual CCs or CGs; and wherein:
the information for modifying the configuration signaled to the UE indicates at least one of an updated status or role of one or more CCs or CGs;
the updated status comprises at least one of activated, de-activated, entering cell, leaving cell, cell group dormancy state, or released; and
the updated role for a CC comprises at least one of a primary cell (PCell) in a MCG, a primary secondary cell (PSCell) in a SCG, or a secondary cell (SCell) in an MCG or SCG.

7. The apparatus of claim 6, wherein the one or more processors are configured, individually or in any combination, to execute the instructions and cause the apparatus to:
apply a default status or role to one or more CCs or CGs for which an updated status or role is not provided to the UE, wherein, for at least one of the CCs or CGs, applying the default status or role comprises maintaining a current status or role.

8. The apparatus of claim 5, wherein the one or more processors are configured, individually or in any combination, to execute the instructions and cause the apparatus to:
receive a selection command, signaled via the MAC layer signaling, indicating the selected one or more of the candidate target PCIs; and
receive an indication of a change to a configuration for at least one of carrier aggregation (CA) or dual connectivity (DC) for one or more individual CCs or CGs associated with the selected one or more of the candidate target PCIs.

9. The apparatus of claim 8, wherein the change to the configuration comprises a change to at least one of a number of CCs in a CG, a role of one or more CCs in the CG, or a role of the CG.

10. The apparatus of claim 8, wherein the change to the configuration comprises a change to at least one of an operating bandwidth, a bandwidth part (BWP), a synchronization signal block (SSB), a random access channel (RACH), a physical downlink control channel (PDCCH), a physical downlink shared channel (PDSCH), physical uplink control channel (PUCCH), or a reference signal (RS) configuration.

11. The apparatus of claim 8, wherein the one or more processors are configured, individually or in any combination, to execute the instructions and cause the apparatus to:
receive signaling preconfiguring the UE with different configurations for at least one of CA or DC for individual CCs or CGs; and
occasionally modify the configuration for at least one CG or CC based on one or more of the configurations.

12. An apparatus for wireless communications by a network entity, comprising:
memory comprising instructions; and
one or more processors configured, individually or in any combination, to execute the instructions and cause the apparatus to:
transmit, to a user equipment (UE), signaling configuring multiple candidate target physical cell identifiers (PCIs) of a candidate target cell;
transmit, to the UE, a medium access control (MAC) layer mobility signaling indicating a selection of one or more of the candidate target PCIs; and
participate in a handover procedure of the UE to a target cell associated with the selected one or more of the candidate target PCIs based on the MAC layer mobility signaling.

13. The apparatus of claim 12, wherein:
information for modifying a configuration for at least one cell group (CG) is implicitly indicated to the UE;
the multiple candidate target PCIs share a common configuration for at least one of a carrier aggregation (CA) or a dual connectivity (DC); and
the configuration is modified by updating the candidate target PCIs associated with component carriers (CCs) of the at least one CG based on the one or more candidate target PCIs associated with the target cell.

14. The apparatus of claim 13, wherein the one or more processors are configured, individually or in any combination, to execute the instructions and cause the apparatus to:
send, to the UE, signaling preconfiguring the UE with different configurations for at least one of CA or DC for the multiple candidate target PCIs; and
modify the configuration by applying one or more preconfigured configurations for the one or more candidate target PCIs associated with the target cell.

15. The apparatus of claim 14, wherein multiple PCIs are associated with the target cell, and wherein the one or more preconfigured configurations comprise:
a same preconfigured CA configuration for at least two of the PCIs associated with the target cell and a source cell;
different preconfigured CA configurations for at least two of the PCIs associated with the target cell and the source cell;
a same preconfigured DC configuration for at least two of the PCIs associated with the target cell and the source cell;
different preconfigured DC configurations for at least two of the PCIs associated with the target cell and the source cell associated with a master cell group (MCG); or
different preconfigured DC configurations for at least two of the PCIs associated with the target cell and the source cell associated with a secondary cell group (SCG).

16. The apparatus of claim 15, wherein:
information for modifying a configuration for at least one cell group (CG) is signaled to the UE via at least one of a downlink control information (DCI) or a MAC control element (MAC-CE); and
the one or more processors are configured, individually or in any combination, to execute the instructions and cause the apparatus to modify the configuration based on the information.

17. The apparatus of claim 16, wherein the one or more processors are configured, individually or in any combination, to execute the instructions and cause the apparatus to:

send, to the UE signaling preconfiguring the UE with different configurations for at least one of CA or DC for individual CCs or CGs; and wherein:

the information for modifying the configuration signaled to the UE indicates at least one of an updated status or role of one or more CCs or CGs;

the updated status comprises at least one of activated, de-activated, entering cell, leaving cell, cell group dormancy state, or released; and the updated role for a CC comprises at least one of a primary cell (PCell) in a master cell group (MCG), a primary secondary cell (PSCell) in a secondary cell group (SCG), or a secondary cell (SCell) in an MCG or SCG.

18. The apparatus of claim 17, wherein the one or more processors are configured, individually or in any combination, to execute the instructions and cause the apparatus to apply a default status or role to one or more CCs or CGs for which an updated status or role is not provided to the UE, wherein, for at least one of the CCs or CGs, applying the default status or role comprises maintaining a current status or role.

19. The apparatus of claim 16, wherein the one or more processors are configured, individually or in any combination, to execute the instructions and cause the apparatus to:
send a selection command signaled via MAC layer signaling indicating the selected one or more of the candidate target PCIs; and
indicate a change to a configuration for at least one of carrier aggregation (CA) or dual connectivity (DC) for one or more individual CCs or CGs associated with the selected one or more of the candidate target PCIs.

20. The apparatus of claim 19, wherein the change to the configuration comprises a change to at least one of a number of CCs in a CG, a role of one or more CCs in the CG, or a role of the CG.

21. The apparatus of claim 19, wherein the change to the configuration comprises a change to at least one of an operating bandwidth, a bandwidth part (BWP), a synchronization signal block (SSB), a random access channel (RACH), a physical downlink control channel (PDCCH), a physical downlink shared channel (PDSCH), a physical uplink control channel (PUCCH), or a reference signal (RS) configuration.

22. The apparatus of claim 19, wherein the one or more processors are configured, individually or in any combination, to execute the instructions and cause the apparatus to:
send signaling preconfiguring the UE with different configurations for at least one of CA or DC for individual CCs or CGs; and
occasionally modify the configuration for at least one CG or CC based on one or more of the preconfigured configurations.

23. A method for wireless communications by a user equipment (UE), comprising:
receiving, from a network entity, signaling configuring multiple candidate target physical cell identifiers (PCIs) of a candidate target cell;
receiving, from the network entity, a medium access control (MAC) layer mobility signaling indicating a selection of one or more of the candidate target PCIs; and
participating in a handover procedure to a target cell associated with the selected one or more of the candidate target PCIs based on the MAC layer mobility signaling.

24. The method of claim 23, wherein:
information for modifying a configuration for at least one cell group (CG) is implicitly indicated to the UE;
the multiple candidate target PCIs share a common configuration for at least one of a carrier aggregation (CA) or a dual connectivity (DC); and
the configuration is modified by updating the candidate target PCIs associated with component carriers (CCs) of the at least one CG based on the one or more candidate target PCIs associated with the target cell.

25. The method of claim 24, further comprising:
receiving signaling preconfiguring the UE with different configurations for at least one of CA or DC for the multiple candidate target PCIs; and
modifying the configuration comprises applying one or more preconfigured configurations for the one or more candidate target PCIs associated with the target cell.

26. The method of claim 25, wherein information for modifying the configuration is signaled to the UE via at least one of a downlink control information (DCI) or a MAC control element (MAC-CE).

27. A method for wireless communications by a network entity, comprising:
transmitting, to a user equipment (UE), signaling configuring multiple candidate target physical cell identifiers (PCIs) of a candidate target cell;
transmitting, to the UE a medium access control (MAC) layer mobility signaling indicating a selection of one or more of the candidate target PCIs; and
participating in a handover procedure of the UE to a target cell associated with the selected one or more of the candidate target PCIs based on the MAC layer mobility signaling.

28. The method of claim 27, wherein:
information for modifying a configuration for at least one cell group (CG) is implicitly indicated to the UE;
the multiple candidate target PCIs share a common configuration for at least one of a carrier aggregation (CA) or a dual connectivity (DC); and
the configuration is modified by updating the candidate target PCIs associated with component carriers (CCs) of the at least one CG based on the one or more candidate target PCIs associated with the target cell.

29. The method of claim 28, further comprising:
sending, to the UE, signaling preconfiguring the UE with different configurations for at least one of CA or DC for the multiple candidate target PCIs; and
modifying the configuration comprises applying one or more preconfigured configurations for the one or more candidate target PCIs associated with the target cell.

30. The method of claim 29, wherein information for modifying the configuration is signaled to the UE via at least one of a downlink control information (DCI) or a MAC control element (MAC-CE).

* * * * *